Figure 3:
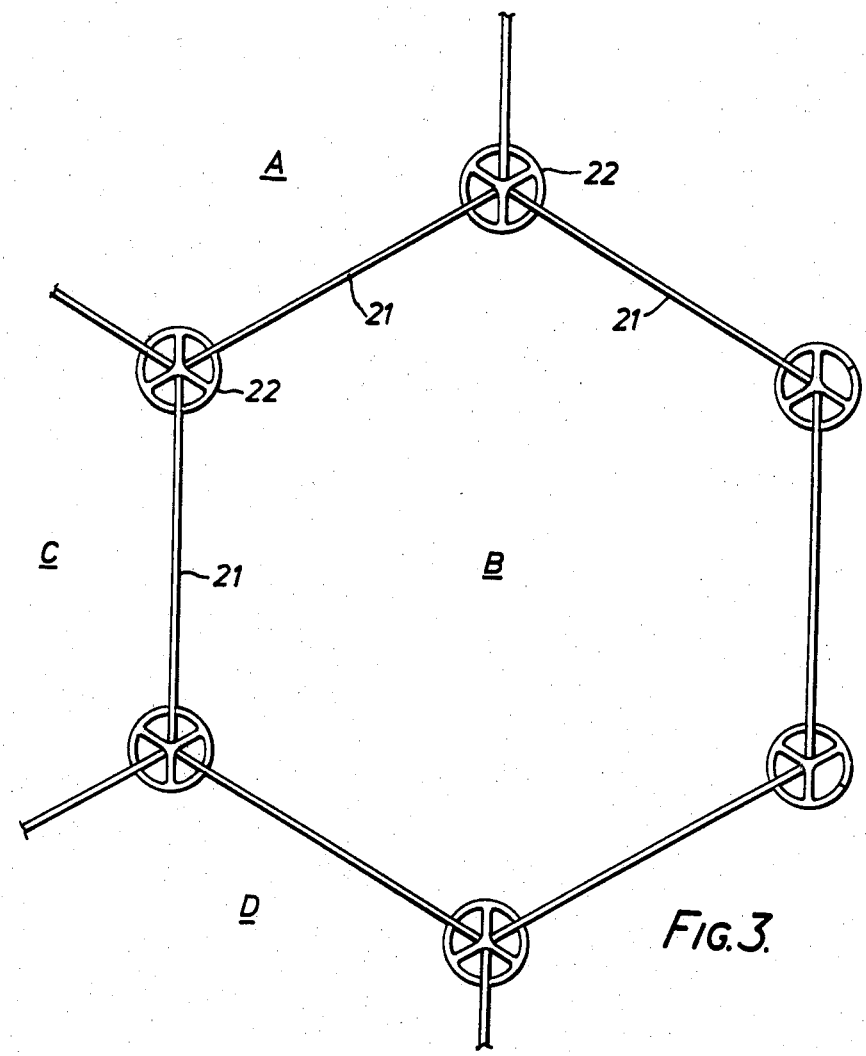

United States Patent [19]

Walton

[11] 4,291,512
[45] Sep. 29, 1981

[54] JOINTS

[76] Inventor: Jeffrey Walton, New North Rd., Huddersfield, Yorkshire, England

[21] Appl. No.: 41,861

[22] Filed: May 22, 1979

[30] Foreign Application Priority Data

May 26, 1978 [GB] United Kingdom ............... 23134/78

[51] Int. Cl.³ .............................................. E04B 1/00
[52] U.S. Cl. ........................................ 52/282; 52/285; 52/482; 46/31
[58] Field of Search ................ 52/285, 582, 282, 482, 52/781, 586; 46/31; 312/140; 403/231, 331; 24/81 R; 40/605, 606, 607

[56] References Cited

U.S. PATENT DOCUMENTS

| | | | |
|---|---|---|---|
| 2,388,297 | 11/1945 | Slaughter | 46/31 X |
| 2,497,657 | 2/1950 | Cole | 46/31 |
| 2,968,118 | 1/1961 | Paulson | 46/31 X |
| 3,528,558 | 9/1970 | Miller | 52/285 X |
| 3,827,177 | 8/1974 | Wengel | 46/31 |
| 3,913,289 | 10/1975 | Recher | 46/31 X |
| 3,955,510 | 5/1976 | Kinik et al. | 46/31 X |
| 3,995,402 | 12/1976 | Parenteau | 52/282 X |

FOREIGN PATENT DOCUMENTS 961000  6/1964  United Kingdom .................... 46/31

Primary Examiner—Price C. Faw, Jr.
Assistant Examiner—Carl D. Friedman
Attorney, Agent, or Firm—Mason, Fenwick & Lawrence

[57] ABSTRACT

A jointing member for supporting one or more sheets of material comprises a hollow cylindrical member divided longitudinally into several separate compartments each having an external wall formed with a slot. The walls are flexible and the edges of the slot grip and support the edge of the sheet of material once inserted into the slot.

10 Claims, 9 Drawing Figures

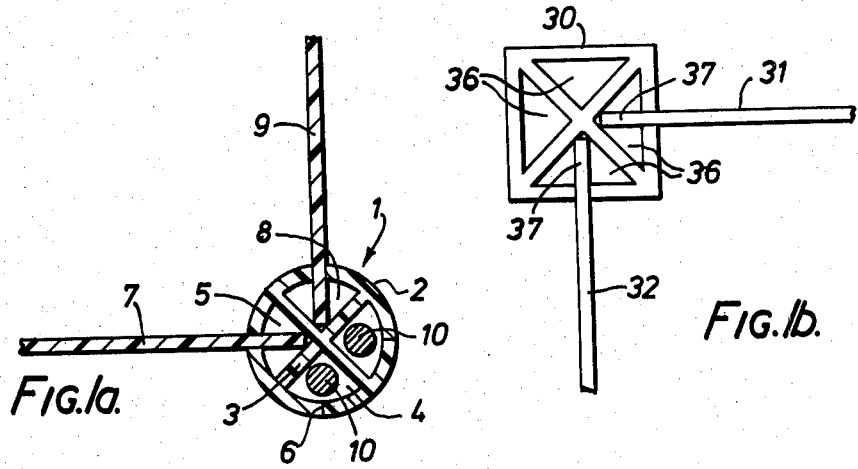
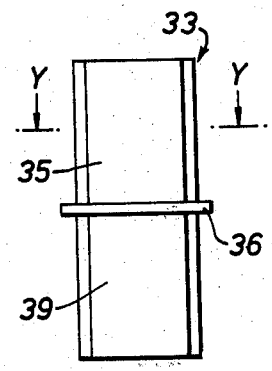
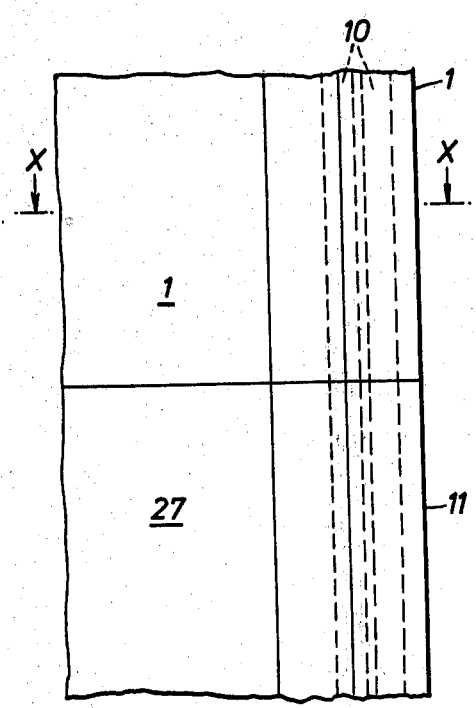
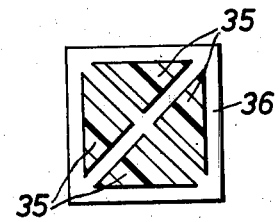

U.S. Patent  Sep. 29, 1981  Sheet 2 of 2  4,291,512

JOINTS

This invention relates to jointing members with longitudinally-slotted walls for receiving material in sheet form.

According to the present invention, there is provided a jointing member for securing two or more sheets of material, for example glass or plastics material, together; said jointing member comprising a resiliently deformable cylindrical body divided longitudinally by internal walls to form within the body two or more hollow compartments wherein at least two of the compartments have an outer wall with a slot for entry of a sheet of material to be joined.

The jointing member may be such that a piece of material inserted into the slot is gripped by the joint.

The internal walls may be integral with the cylindrical body and may be formed of a plastics material. The cylindrical body may have a square, rectangular or circular cross-section.

The jointing member may form a corner joint of a cold frame, compost heap confining enclosure or herb confining enclosure.

The jointing member may be arranged to facilitate stacking of jointing member by providing opposing ends of a joint with structures which mate together. The jointing member may also be provided with rods which extend longitudinally through more than one jointing member, thus holding them rigid when stacked. The jointing members may be stacked by use of a connector piece which is arranged to mate with the top of one jointing member and the bottom of another.

Figure 5:
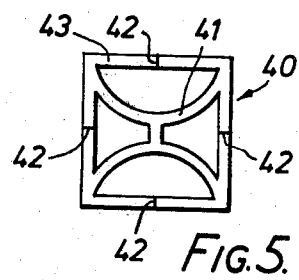
Figure 6:
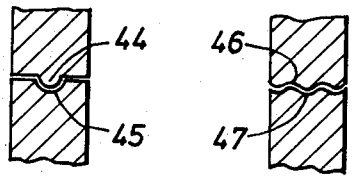

Various embodiments of the invention will now be described by way of example only, making reference to the accompanying drawings in which:

FIG. 1a shows in cross-section a jointing member according to the invention being used to join together two adjacent walls of a cold frame, FIG. 1b shows a jointing member in plan view, FIG. 2 illustrates how two jointing members as shown in FIG. 1a may be stacked, FIG. 3 shows a plan view of a hexagonal framework using jointing members according to the invention, FIG. 4a shows an elevation of a connector, FIG. 4b shows a cross-section along the line YY of the connector shown in FIG. 4a taken in the direction of the arrows, FIG. 5 shows a modified form of the joint of FIG. 1b, and FIGS. 6a and b are sections on an enlarged scale of part of the wall of the connector.

Referring to FIG. 1a of the accompanying drawings, a jointing member, denoted generally by the reference numeral 1, consists of a cylindrical body 2 moulded of a resilient plastics material. Within, and integral with, the body 2 are four radial walls, e.g. wall 3, dividing the body longitudinally into four compartments. One of these compartments is denoted in FIG. 1a by the reference numeral 4.

The outer wall of each compartment has a longitudinal slot, e.g. slot 6, in the wall of compartment 4. When the jointing member is not in use the slots are held closed by the resilience of the body 2 and the walls 3. In use, as shown in FIG. 1a, the edge of a sheet of material rests in the slot in a compartment wall. In FIG. 1a a sheet of plastics material 7, forming one wall of a cold frame rests in the slot in the outer wall of a compartment 5; and another sheet of plastics material 9 rests in the slot in the outer wall of a compartment 8. Insertion of the material 7 and 9 into the compartments 5 and 8 respectively deforms the body 2 and walls 3 of the joint. Consequently a restoring force is exerted by the outer walls of the compartments 5 and 8 which grips the material 7 and 9. The slots may be opened prior to insertion of the material 7 and 9 by use of a special tool.

Referring to FIG. 2 part of two jointing members according to the invention are shown in elevation such that FIG. 1a shows a cross-section taken on the line XX in the direction of the arrows. The jointing member 1 is shown stacked on top of the jointing member 11. The jointing member 1 is gripping a sheet of material 7, which lies on top of a sheet of material 27 which is gripped by the jointing member 11. The jointing members 1 and 11 are held together by rods 10. As can be seen from FIG. 1a the rods 10 pass through the unused compartments in the jointing member. If, however, all the compartments are used, thinner rods can be inserted between the material and the radial walls.

The fact that the jointing members illustrated in FIG. 2 may be stacked enables a cold frame constructed using such jointing members to be increased in height as the plants in it grow. Another method of stacking jointing members embodying the invention involves making one end of each jointing member devoid of dividing walls for a short distance up the jointing member. The other end of the jointing member is constructed to have no outer wall for a similar distance. When the jointing members are stacked the dividing walls of one end of one jointing member fit into the cylindrical outer wall at the end of the other jointing member. For extra strength rods in the unused compartments could also be employed. Jointing members can also be stacked.

FIG. 1b shows a plan view of a jointing member 30 joining together two sheets of material 31 and 32. Another jointing member of similar construction may be stacked on top of the jointing member 30 by use of a connector 33 illustrated in FIG. 4a and FIG. 4b.

The connector 33 has, on one side of a flange 36, four upstanding protrusions 35 and on the other side of the flange four similar protrusions 39. When it is desired to stack the other jointing member on top of the jointing member 30 the protrusions 39 are fitted into the top of the compartments 36 of the jointing member 30 and the compartments of the other jointing member are fitted over the protrusions 35. The two jointing members are pushed together until they abut the faces of the flange 36. Rectangular cut outs 37 are provided in the corners of the sheets of material to prevent them from fouling the connector 33.

Referring now to FIG. 3 a hexagonal framework is composed of rigid walls 21 and jointing members 22. The framework forms part of a cold frame/herb garden/compost heap complex suitable for use in a small kitchen garden. The framework may be used to divide a kitchen garden into gardening modules. In one module, for example module A, is a compost heap. As the compost heap fills up, the walls can be extended in the manner described with reference to FIG. 2. Module B is a cold frame for growing early lettuces. In cold weather a suitable sheet of transparent plastics material or glass can be laid over the module B for protection from frost. Module C contains a patch of growing mint. The walls of module C extend about a foot below ground to prevent the roots of the mint from encroaching upon adjoining modules. Module D contains anther herb such as marjoram, which unless confined can spread.

The internal walls of the jointing member shown in FIG. 1b may be arranged somewhat differently as shown in FIG. 5. The jointing member 40 shown in FIG. 5 has curved internal longitudinal walls 41 and longitudinal slots 42 through the center of each of the boundary walls 43 of the jointing member. The jointing member is used in the same way as the jointing members shown in FIGS. 1a and 1b.

Where the jointing member 1 is used to grip very thin sheets, the grip on the latter can be improved by forming the facing edges abutting the slit with a tongue and groove 44, 45 as shown in FIG. 6a or with meshing corrugations 46, 47 as shown in FIG. 6b.

Alternatively, the edges of the sheets may be thickened to increase resistance to withdrawal of the sheet from the slot once inserted into the latter. It will be understood that the thickened portion passes into the compartment and the walls close on the inward side (with respect to the edge of the sheet) of the portion.

The thickening need not be continuous, spaced localised areas of thickening may be quite satisfactory. The thickened area or areas may be integral with the sheet or it or they may be applied separately. Small adhesive pads may be used and applied at spaced intervals to the sheet adjacent the edges thereof.

The jointing members described may also be used in a somewhat different manner to provide the frame for a cloche. In this case two jointing members are taken and fixed on the ground in approximately parallel relationship by pins which pass through transverse holes which are additionally provided in the jointing members and into the ground. A sheet of clear plastics material is secured along one edge in an upwardly directed slot in one of the jointing members, is secured along the opposite edge in an upwardly directed slot in the other of the jointing members and extends between the jointing members in an arch. The relative height and width of the cloche so formed can be adjusted merely by adjusting the separation of the jointing members. The length of the cloche can be adjusted by "stacking" jointing members end to end along the ground using the techniques described above.

Whereas the invention has been described by way of examples useful in horticulture, it must be realised that the invention could equally well be used in other fields. Furthermore, jointing members according to the invention could be used in the construction of display stands.

I claim:

1. A jointing member of hollow cylindrical form having at least one internal compartment extending lengthwise of the member part of the surface of the member forming an outer wall of the internal compartment, said outer wall being slit longitudinally of the member to divide the wall into two lips whose edges are in contact, the lips being of a resilient material and thereby deformable to allow entry into the compartment of the edge of a sheet of material which is then retained in position by said resilient lips.

2. A jointing member as claimed in claim 1 in which said edges are contoured to provide inter-meshing surfaces.

3. A jointing member as claimed in claim 1 in which said edges incorporate a tongue and groove type connection.

4. A jointing member as claimed in claim 1 in which the edges of the said wall parts are corrugated, the corrugations inter-meshing.

5. A jointing member as claimed in claim 1 in which the member has at least one internal wall which defines, in part said internal compartment, said internal wall extending over part only of the length of the member, there being an end portion of said member that is not divided internally.

6. A jointing member as claimed in claim 5 in which said member has two end portions that are not divided internally.

7. An assembly as claimed in claim 5 and further comprising a connecting member located in the end portion of one jointing member and partly in the end portion of another jointing member.

8. A jointing member as claimed in claim 1 and further including a plurality of internal walls that divide said member into several longitudinally-extending hollow compartments, each said compartment having an outer wall with a slit that extends longitudinally of the member and divide said outer wall into two parts whose edges are in contact, said parts being of a resilient material whereby said parts are deformable to allow entry into said slot of a sheet of material which is then retained in said slot by said resilient parts of said wall.

9. An assembly comprising at least two jointing members as claimed in claim 8, the jointing members being so arranged that the hollow compartments therein are aligned one with another, and a connecting member located partly within a compartment of one supporting member and partly within the aligned compartment of the other supporting member.

10. An assembly as claimed in claim 7 in which the connecting member has a peripheral flange between its ends, the flange abutting adjacent ends of the two jointing members.

* * * * *